US008087818B2

(12) United States Patent
Drees

(10) Patent No.: US 8,087,818 B2
(45) Date of Patent: Jan. 3, 2012

(54) BLADE-MOTOR COUPLER FOR A BLENDER

(75) Inventor: Steven C. Drees, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 514 days.

(21) Appl. No.: 12/326,951

(22) Filed: Dec. 3, 2008

(65) Prior Publication Data

US 2010/0135109 A1 Jun. 3, 2010

(51) Int. Cl.
*B01F 7/16* (2006.01)
(52) U.S. Cl. ......... 366/199; 366/205; 366/274; 366/331
(58) Field of Classification Search .................. 366/273, 366/274, 197, 199, 205, 314, 331
See application file for complete search history.

(56) References Cited

U.S. PATENT DOCUMENTS

| 4,013,384 | A | * | 3/1977 | Oikawa | 417/368 |
|---|---|---|---|---|---|
| 4,115,040 | A | * | 9/1978 | Knorr | 417/420 |
| 5,368,390 | A | * | 11/1994 | Gambrill et al. | 366/273 |
| 5,427,450 | A | * | 6/1995 | Gambrill | 366/168.1 |
| 5,708,313 | A | * | 1/1998 | Bowes et al. | 310/90.5 |
| 6,084,498 | A | * | 7/2000 | Stelter et al. | 335/306 |
| 6,095,677 | A | | 8/2000 | Karkos, Jr. et al. | |
| 6,210,033 | B1 | | 4/2001 | Karkos, Jr. et al. | |
| 6,536,938 | B2 | * | 3/2003 | Zhou | 366/273 |
| 6,715,706 | B1 | | 4/2004 | Planca et al. | |
| 6,793,167 | B2 | | 9/2004 | Karkos, Jr. et al. | |
| 6,811,298 | B2 | | 11/2004 | Penaranda et al. | |
| 6,908,291 | B2 | * | 6/2005 | Klein et al. | 417/420 |
| 7,186,018 | B2 | * | 3/2007 | Burak | 366/273 |
| 7,387,269 | B2 | | 6/2008 | Mally | |
| 7,547,135 | B2 | * | 6/2009 | Kocienski | 366/273 |
| 7,575,389 | B2 | * | 8/2009 | Nance | 403/109.2 |
| 7,707,720 | B2 | * | 5/2010 | Klein et al. | 29/888.024 |
| 7,874,719 | B2 | * | 1/2011 | Markle et al. | 366/273 |
| 2001/0043508 | A1 | * | 11/2001 | Zhou | 366/273 |
| 2006/0209627 | A1 | | 9/2006 | McGill | |
| 2006/0275075 | A1 | | 12/2006 | Katz et al. | |
| 2007/0053238 | A1 | * | 3/2007 | Kocienski | 366/273 |
| 2007/0133349 | A1 | * | 6/2007 | Burak | 366/273 |
| 2007/0134061 | A1 | * | 6/2007 | Nance | 403/362 |
| 2007/0140054 | A1 | | 6/2007 | Stocker | |
| 2007/0286015 | A1 | * | 12/2007 | Markle | 366/273 |
| 2010/0135109 | A1 | * | 6/2010 | Drees | 366/274 |

* cited by examiner

*Primary Examiner* — Tony G Soohoo
(74) *Attorney, Agent, or Firm* — Tara M. Hartman; Barnes & Thornberg, LLP

(57) ABSTRACT

A coupling assembly for coupling a blade assembly of a removable jar to a motor located in the base of a blender includes a tapered metallic male coupler that is received into a tapered non-metallic female coupler. An electromagnetic field is generated to secure the male coupler in the female coupler.

16 Claims, 3 Drawing Sheets

BLADE-MOTOR COUPLER FOR A BLENDER

TECHNICAL FIELD

The present disclosure relates generally to countertop kitchen appliances, and more particularly, to blenders and similar devices.

BACKGROUND

Blenders and similar countertop kitchen appliances generally include a jar into which food or other contents can be placed, and a base. Blades or similar devices for blending the contents of the jar are typically disposed within the jar. The jar is generally removable from the base for ease of use, ease of cleaning, or other reasons. The base contains a motor and controls for operating the appliance. The motor drives the blades in response to activation of one of the controls.

SUMMARY

The present disclosure is directed to a blade-motor coupler for a blender or similar appliance that has a removable food receptacle or jar.

According to one aspect, a blender includes a base with a motor therein. A jar is supported by and detachable from the base. The jar has a blade assembly. A male coupler is coupled to the blade assembly. The male coupler is responsive to an electromagnetic field. A female coupler is coupled to the motor. The female coupler is configured to receive the male coupler. The blender also includes a mechanism for generating an electromagnetic field that extends across the female coupler to secure the male coupler within the female coupler.

In one embodiment, the male coupler is metallic and the female coupler is non-metallic.

The male coupler may be external to the jar, with at least a portion of the female coupler being internal to the base.

The male coupler may have a tapered outer surface, with the female coupler having a tapered inner surface. The tapered outer surface of the male coupler engages the tapered inner surface of the female coupler when the male coupler is received into the female coupler.

The mechanism for generating the electromagnetic field that extends across the female coupler may include a coil which surrounds the female coupler.

A spring is configured to urge the male coupler into contact with the female coupler.

Both the male coupler and the female coupler may be frustoconical in shape.

According to another aspect, a coupling assembly for coupling a blade assembly to a motor of a blender includes a metallic male coupler coupled to the blade assembly, and a non-metallic female coupler coupled to the motor. The female coupler has an interior region configured to receive the male coupler. A coil is positioned around the female coupler and configured to generate an electromagnetic field in the interior region of the female coupler.

In an embodiment, the coil is spaced apart from the female coupler.

The male coupler may have a tapered outer surface, with the female coupler having a tapered inner surface. The tapered outer surface of the male coupler engages the tapered inner surface of the female coupler when the male coupler is received into the female coupler.

A spring is configured to urge the male coupler into contact with the female coupler.

Both the male coupler and the female coupler may be frustoconical in shape.

According to another aspect, a countertop kitchen appliance for processing food includes a base with a motor therein. A jar is supported by and detachable from the base. The jar has a blade assembly. A metallic male coupler is coupled to the blade assembly, and a non-metallic female coupler coupled to the motor. The female coupler has an interior region configured to receive the male coupler. A coil is positioned around the female coupler and configured to generate an electromagnetic field in the interior region of the female coupler.

In an embodiment, the coil is spaced apart from the female coupler.

The male coupler may have a tapered outer surface, with the female coupler having a tapered inner surface. The tapered outer surface of the male coupler engages the tapered inner surface of the female coupler when the male coupler is received into the female coupler.

A spring is configured to urge the male coupler into contact with the female coupler.

Both the male coupler and the female coupler may be frustoconical in shape.

The male coupler may be external to the jar, with at least a portion of the female coupler being internal to the base.

BRIEF DESCRIPTION OF THE DRAWINGS

In the drawings, like reference numerals refer to corresponding parts in the several views. To facilitate explanation, elements shown in the figures are not necessarily drawn to scale and may or may not be drawn in proportionate size to one another.

DETAILED DESCRIPTION OF THE DRAWINGS

Figure 1:
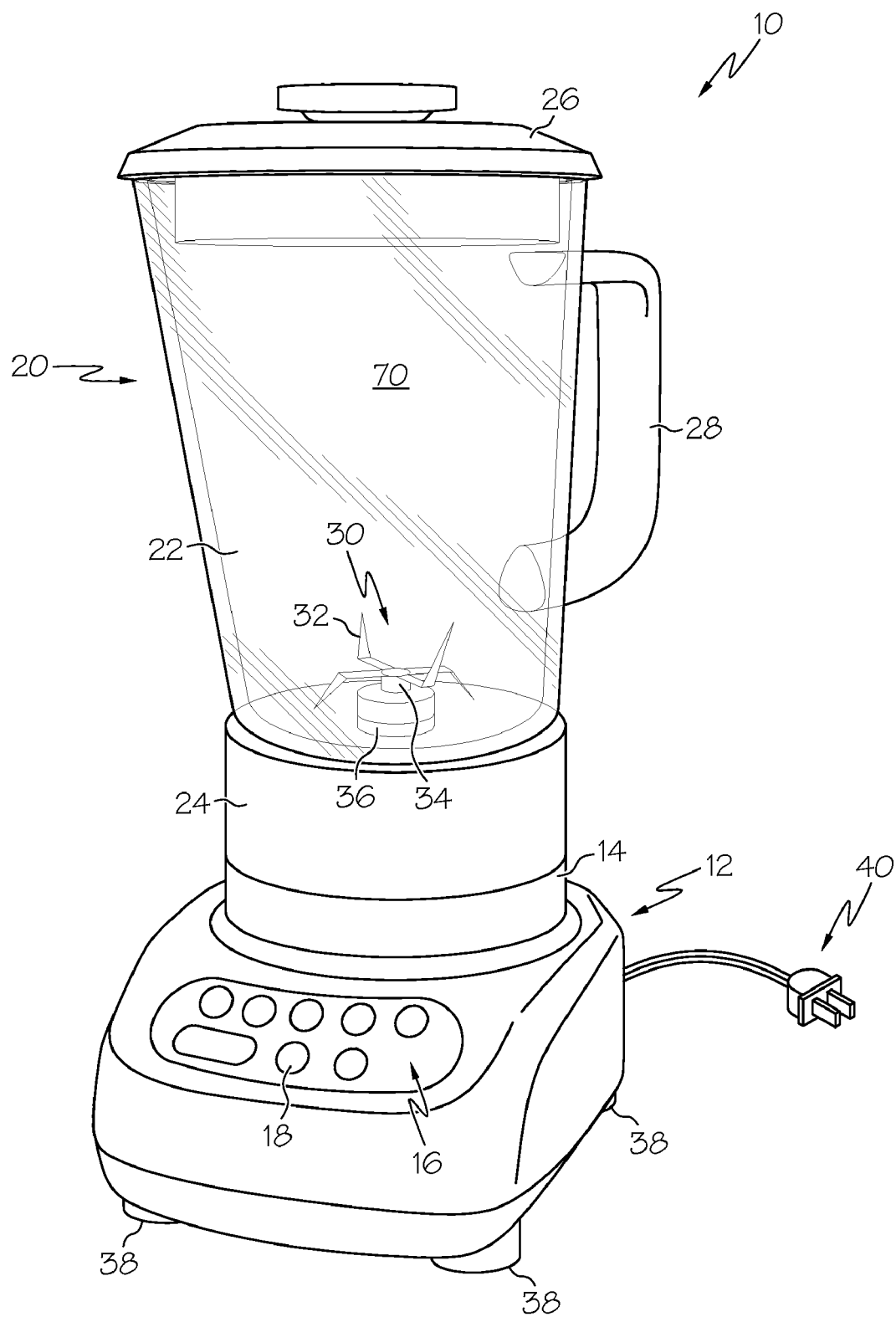
FIG. 1 is a perspective view of an exemplary blender including a base and a jar supported by the base.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 2:
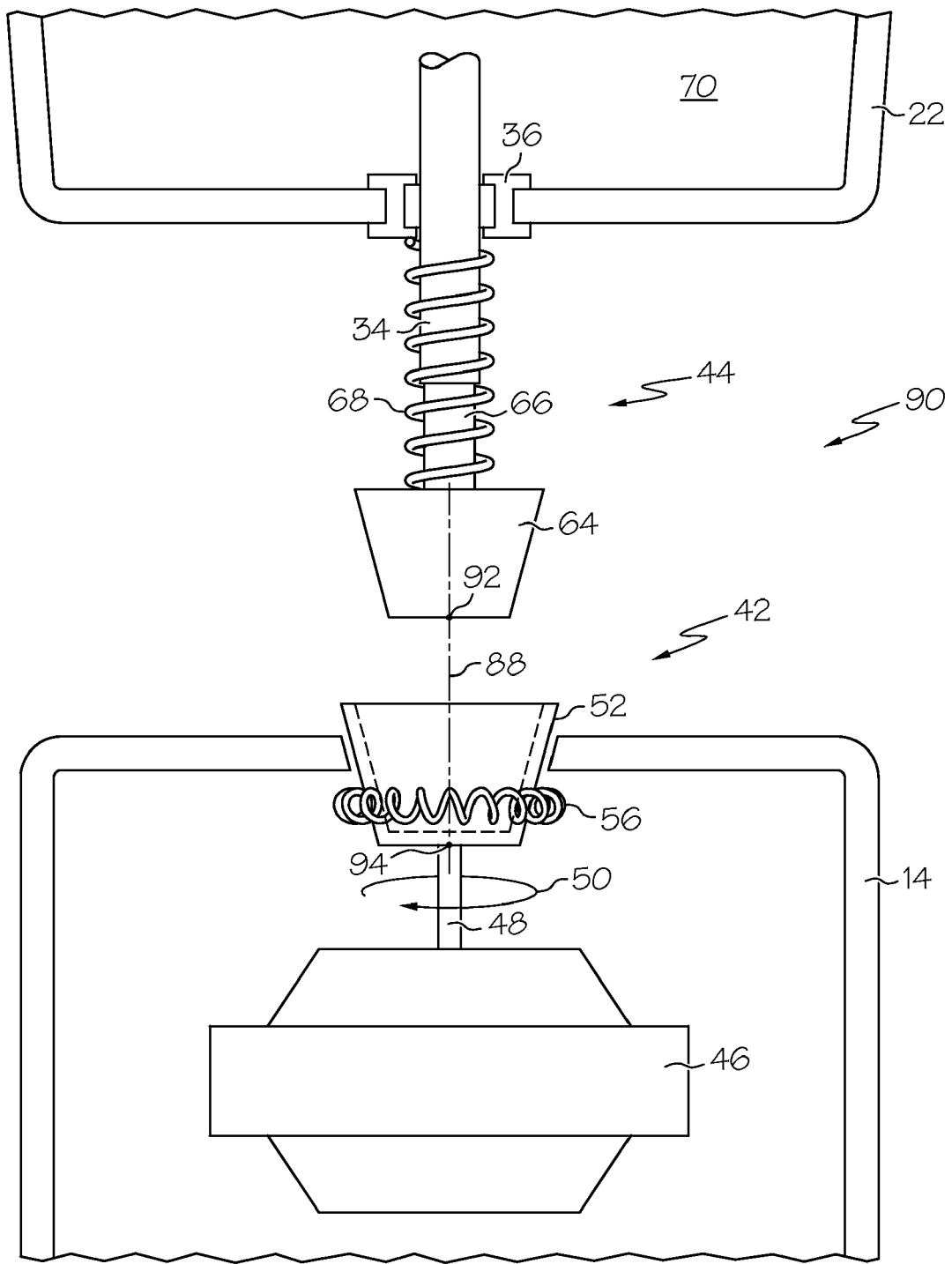
FIG. 2 is an enlarged fragmentary cross-sectional view of the blender of FIG. 1, note that the components within the base along with the components of the coupling assembly are not shown in cross section for clarity of description.
Figure 3:
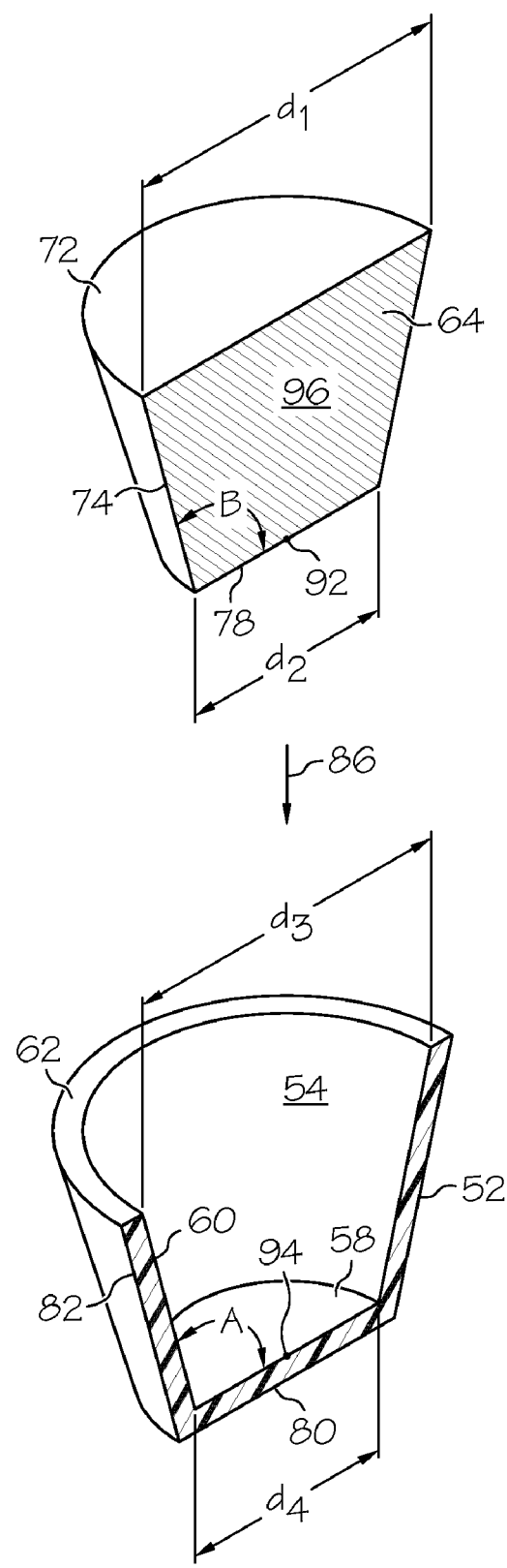
FIG. 3 is a cross-sectional perspective view of the female coupler and the male coupler of the blender of FIG. 1.

Referring now to FIG. 1, there is shown a blender 10 which includes a base 12, a removable jar 20, a blade assembly 30 disposed within the jar 20, and a motor 46 disposed within the base 12. A coupling assembly 90 detachably couples the blade assembly 30 to the motor 46 as shown in FIGS. 2-3 and described below.

The base 12 has a neck 14 extending upwardly therefrom. A control pad 16 is supported by the base 12. The control pad 16 includes one or more controls 18 for operating the blender 10, such as membrane switches, buttons, dials, slides, or the like. The base 12 is supported above a countertop or other surface by a plurality of feet 38. The base 12 includes a housing, which is typically made of die-cast metal or a plastic such as polycarbonate. Electrical current is typically supplied to the base 12 by a plug 40, which is connectable to a wall outlet; however, one or more features of the blender 10 may alternatively be driven by battery power.

The jar 20 includes a receptacle 22, an optional collar 24, a lid 26, and a handle 28. In the illustrated embodiment, the collar 24 encircles and engages the neck 14 when the jar 20 is attached to the base 12. In other embodiments, the collar 24 is not used. The jar 20 is typically made of plastic (e.g., polycarbonate), glass or stainless steel.

Food, beverages or other items may be placed in the receptacle 22 to be operated on by the blade assembly 30. The lid 26 is removable from the jar 20 and covers the top portion of the interior region 70 of the jar 20 when positioned on it. The handle 28 is configured to be gripped by a user to facilitate movement of the jar 20 relative to the base 12 or for other reasons.

The blade assembly 30 includes one or more blades 32, a blade shaft 34, and a bushing 36. In the illustrated embodiment, the blades 32 are of the "double d" type, however, any suitable type of cutting, grinding, mixing, slicing, blending or similar implement may be used. The blade shaft 34 extends downwardly through the bushing 36.

A motor 46 is mounted in the housing 14 by a floating mount (not shown). The floating mount is configured to improve the alignment of the drive shaft 48 with the blade shaft 34, among other things. The motor 46 is configured to operate at multiple speeds, which are selectable via the controls 18. In operation, the motor 46 rotates the drive shaft 48 in a forward or clockwise direction as shown by arrow 50, or in the reverse or counterclockwise direction. The motor 46 is an electric motor, such as a universal motor, permanent magnet DC (PMDC) motor, or other type of electric motor suitable for use in a kitchen appliance of the type described herein.

The coupling assembly 90 detachably connects the blade shaft 34 to the motor 46 when the jar 20 is mounted on the base 12. As shown in FIGS. 2-3, the coupling assembly 90 includes a base coupler 42 and a jar coupler 44.

The base coupler 42 is fixedly coupled to the drive shaft 48. For example, the base coupler 42 may have a threaded portion, which screws onto a correspondingly threaded portion of the drive shaft 48. In operation, the motor 46 drives the base coupler 42 in the same direction as the drive shaft 48. The base coupler 42 includes a female coupler 52 and a coil 56.

As shown in FIG. 3, the female coupler 52 is generally frustoconical in shape and has a hollow interior region 54 configured to receive the male coupler 64. The interior region 54 is defined by an inner bottom surface 58 and an inner side surface 60. The female coupler 52 has an exterior defined by a top surface 62, an outer bottom surface 80, and an outer side surface 82. Inner bottom surface 58 and outer bottom surface 80 are both substantially circular in shape. The inner side surface 60 is substantially smooth and regular. The inner side surface 60 is tapered. While the outer side surface 82 is shown as tapered in the drawings, this is not required as long as the inner side surface 60 is tapered.

To define the taper of the inner side surface 60, the diameter $d_3$ of the circle defined by the inner side surface at the top surface 62 is larger than the diameter $d_4$ of the inner bottom surface 58. A taper angle A is defined by the intersection of the inner bottom surface 58 and the inner side surface 60. Angle A is greater than ninety (90) degrees. A center point 94 is the center point of both the inner and the outer bottom surfaces 58, 80.

The female coupler 52 is made of a non-conductive material such as plastic. The coil 56 is attached to the housing 14 by conventional mounting hardware and fasteners or other mounting techniques. In the illustrative embodiment described herein, the coil 56 is not in direct contact with the female coupler 52. When driven by the drive shaft 48, the female coupler 52 rotates freely while being surrounded by the coil 56.

The coil 56 is an electromagnetically inductive coil made of a conductive material such as copper or steel. Insulated wiring or other suitable conductor couples the coil 56 to a source of electricity provided in the base 14. When the motor 46 is activated, e.g. by activation of a control 18, the coil 56 generates an electromagnetic field in and/or around a region 54.

The jar coupler 44 includes a male coupler 64, a coupler shaft 66, and a spring 68. The coupler shaft 66 is fixedly coupled to the blade shaft 34. For example, the coupler shaft 66 may have a threaded portion that screws into a correspondingly threaded portion of the blade shaft 34.

The spring 68 slides along the coupler shaft 66 to provide tolerance for jars of different heights, and more particularly, for jars that have collars of different heights. As such, the spring 68 allows the jar coupler 44 to have upwardly and downwardly movement relative to the jar 20 so that the jar coupler 44 is able to mate tightly with the base coupler 42, independently of the height of the jar 20 or the collar 24. In other words, the vertical height of the jar coupler 44 is adjustable via the spring 68.

The coupler shaft 66 is fixedly coupled to the male coupler 64. For example, the coupler shaft 66 may have a threaded portion, which screws into a correspondingly threaded portion of male coupler 64.

The male coupler 64 is also generally frustoconical in shape and, as a result, has a substantially trapezoidal cross-section as shown in FIGS. 2-3. The male coupler 64 has a top surface 72, a bottom surface 78, and a side surface 74, which define a filled region 96. In the illustrated embodiment, the male coupler is solid (i.e., the filled region 96 is made of the same material as its outer surfaces 72, 74, 78). The top and bottom surfaces 72, 78 are both circular in shape. The side surface 74 is substantially smooth and regular.

The side surface 74 is tapered similarly to the inner side surface 60 of the female coupler 52. To define the taper of the side surface 74, the diameter $d_1$ of the circle defined by top surface 72 is larger than the diameter $d_2$ of the bottom surface 78. A taper angle B is defined by the intersection of the bottom surface 78 and the side surface 74. The taper angle B is greater than ninety (90) degrees. A center point 92 is the center point of the bottom surface 78.

The male coupler 64 is made of a conductive material, such as steel or other ferrous material. As such, when an electrical current passes through the coil 56 (when the blender is turned on, for example), a magnetic field is created. The magnetic field passes through the center of the coil 56. The electromagnetic field generated when electrical current is applied to the coil 56 acts on the male coupler 64 when the male coupler 64 moves into the region of the coil 56. When the male coupler 64 moves through the electromagnetic field, the magnetic force generated by the energized coil 56 pulls the male coupler 64 downwardly in the direction of arrow 86 into the interior region 54 of the female coupler 52. The bottom surface 78 of the male coupler 64 is drawn downwardly toward the inner bottom surface 58 of the female coupler 52.

As the male coupler 64 is drawn into the female coupler 52, the smooth and regular side surface 74 of the male coupler 64 engages the smooth and regular inner side surface 60 of the female coupler 52. The tapered configuration of the side surface 74 of the male coupler 64 and the inner side surface 60 of the female coupler 52 further tightens the engagement of the male coupler 64 with the female coupler 52. As a result, a rigid coupling typically occurs without direct engagement of the bottom surface 78 of the male coupler 64 with the bottom inner surface 58 of the female coupler 52.

The taper angle B of the male coupler 64 is substantially the same as the taper angle A of the female coupler 52. However, the diameters $d_1$, $d_2$ of the male coupler 64 are slightly smaller than the respective diameters $d_3$, $d_4$ of the female coupler 52. The center points 92, 94 of the couplers 64, 52 align along an axis 88 by virtue of the above-described construction. The provision of the spring 68 and the floating mount of the motor 46 in the base 14 also reduce the possibility of misalignment.

With the male coupler 64 coupled to the female coupler 52, rotation of the drive shaft 48 by the motor 46 causes the blade shaft 34 to rotate in the same direction as the drive shaft 48. Rotation of the blade shaft 34 moves the blades 32 to process (i.e., blend) the contents of the receptacle 22. In this way, the blades 32 are coupled to the motor 46 without the need for interlocking teeth or similar structural features of conventional designs.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, although a blender is depicted, it should be understood that the present invention is also applicable to food processors, choppers, frozen drink makers, and similar devices that have a removable receptacle.

There are a plurality of advantages of the present disclosure arising from the various features of the apparatus, system, and method described herein. It will be noted that alternative embodiments of the apparatus, system, and method of the present disclosure may not include all of the features described yet still benefit from at least some of the advantages of such features. Those of ordinary skill in the art may readily devise their own implementations of the apparatus, system, and method that incorporate one or more of the features of the present invention and fall within the spirit and scope of the present disclosure as defined by the appended claims.

The invention claimed is:

1. A blender comprising:
a base,
a motor within the base,
a jar supported by and detachable from the base,
a blade assembly within the jar,
a male coupler coupled to the blade assembly, the male coupler being responsive to an electromagnetic field,
a female coupler coupled to the motor, the female coupler being configured to receive the male coupler,
a spring configured to urge the male coupler into contact with the female coupler, and
means for generating an electromagnetic field that extends across the female coupler to secure the male coupler within the female coupler, the means for generating the electromagnetic field comprising a coil which surrounds the female coupler.

2. The blender of claim 1, wherein the male coupler is metallic and the female coupler is non-metallic.

3. The blender of claim 2, wherein:
the male coupler is external to the jar, and
at least a portion of the female coupler is internal to the base.

4. The blender of claim 3, wherein:
the male coupler has a tapered outer surface,
the female coupler has a tapered inner surface, and
the tapered outer surface of the male coupler engages the tapered inner surface of the female coupler when the male coupler is received into the female coupler.

5. The blender of claim 1, wherein both the male coupler and the female coupler are frustoconical in shape.

6. A coupling assembly for coupling a blade assembly to a motor of a blender, comprising:
a metallic male coupler coupled to the blade assembly, the male coupler having an outer surface,
a non-metallic female coupler coupled to the motor, the female coupler having an inner surface and an interior region configured to receive the male coupler such that the outer surface of the male coupler engages the inner surface of the female coupler, and
a coil positioned around the female coupler and configured to generate an electromagnetic field in the interior region of the female coupler.

7. The coupling assembly of claim 6, wherein the coil is spaced apart from the female coupler.

8. The coupling assembly of claim 6, wherein:
the outer surface of the male coupler is tapered,
the inner surface of the female coupler is tapered, and
the tapered outer surface of the male coupler engages the tapered inner surface of the female coupler when the male coupler is received into the female coupler.

9. The coupling assembly of claim 8, wherein:
both the male coupler and the female coupler are frustoconical in shape.

10. The coupling assembly of claim 9, further comprising a coupler shaft connected to the male coupler and a spring positioned around the coupler shaft.

11. A countertop kitchen appliance for processing food, comprising:
a base,
a motor within the base,
a jar supported by and detachable from the base,
a blade assembly within the jar,
a metallic male coupler coupled to the blade assembly, the male coupler having an outer surface,
a non-metallic female coupler coupled to the motor, the female coupler having an inner surface and an interior region configured to receive the male coupler such that the outer surface of the male coupler engages the inner surface of the female coupler, and
a coil positioned around the female coupler and configured to generate an electromagnetic field in the interior region of the female coupler.

12. The countertop kitchen appliance of claim 11, wherein the coil is spaced apart from the female coupler.

13. The countertop kitchen appliance of claim 11, wherein:
the outer surface of the male coupler is tapered,
the inner surface of the female coupler is tapered, and
the tapered outer surface of the male coupler engages the tapered inner surface of the female coupler when the male coupler is received into the female coupler.

14. The countertop kitchen appliance of claim 13, wherein:
both the male coupler and the female coupler are frustoconical in shape.

15. The countertop kitchen appliance of claim 11, further comprising a coupler shaft connected to the male coupler and a spring positioned around the coupler shaft.

16. The countertop kitchen appliance of claim 11, wherein:
the male coupler is external to the jar, and
at least a portion of the female coupler is internal to the base.

* * * * *